(12) United States Patent
Jean (10) Patent No.: US 9,885,470 B1
(45) Date of Patent: Feb. 6, 2018

(54) ILLUMINANT HANDRAIL

(71) Applicant: KHAN'S ENTERPRISE CO., LTD., Taoyuan (TW)

(72) Inventor: Wen-Fong Jean, Taoyuan (TW)

(73) Assignee: Khan's Enterprise Co., Ltd., Taoyuan (TW)

( * ) Notice: Subject to any disclaimer, the term of this patent is extended or adjusted under 35 U.S.C. 154(b) by 0 days.

(21) Appl. No.: 15/216,733

(22) Filed: Jul. 22, 2016

(51) Int. Cl.
| | |
|---|---|
| F21V 33/00 | (2006.01) |
| F21V 23/00 | (2015.01) |
| E04F 11/18 | (2006.01) |
| B63B 17/04 | (2006.01) |
| B60Q 3/02 | (2006.01) |
| F21Y 115/10 | (2016.01) |
| F21W 111/08 | (2006.01) |

(52) U.S. Cl.
CPC .......... *F21V 33/006* (2013.01); *B60Q 3/0233* (2013.01); *B63B 17/04* (2013.01); *E04F 11/1804* (2013.01); *E04F 11/1808* (2013.01); *F21V 23/002* (2013.01); *E04F 2011/1872* (2013.01); *F21W 2111/08* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 5,396,740 | A | * | 3/1995 | Bocchi ................. A47K 17/022 182/106 |
| 6,065,852 | A | * | 5/2000 | Crumley .................. F21S 4/20 362/146 |
| 2003/0133311 | A1 | * | 7/2003 | Robertson ............. F04D 25/088 362/555 |
| 2008/0007418 | A1 | * | 1/2008 | Maki ....................... G09F 27/00 340/686.6 |
| 2008/0080173 | A1 | * | 4/2008 | Trimble .................. E04F 11/18 362/146 |
| 2009/0154162 | A1 | * | 6/2009 | McCall ................. F21V 33/006 362/249.16 |
| 2010/0110681 | A1 | * | 5/2010 | Wilcox ................... B63B 45/04 362/235 |
| 2013/0058074 | A1 | * | 3/2013 | Somei ................... F21V 33/006 362/145 |
| 2013/0076269 | A1 | * | 3/2013 | Shilton ..................... F21L 4/08 315/360 |

* cited by examiner

*Primary Examiner* — Kristy A Haupt
(74) *Attorney, Agent, or Firm* — Alan D. Kamrath; Kamrath IP Lawfirm, P.A.

(57) ABSTRACT

An illuminant handrail includes a rod and two fixing seats respectively fixed to two ends of the rod. A fastener is mounted to a bottom of and extends downward from each fixing seat. Two illuminating devices are respectively mounted to the bottoms of the fixing seats. Each illuminating device includes a lamp seat receiving an illuminating unit. The lamp seat of each illuminating device is transparent and includes a top wall and a peripheral wall connected to the top wall. The top wall includes a fixing hole through which one of the fasteners extends. Each illuminating unit includes a lighting unit and a circuit board. Each illuminating unit is mounted between the fixing hole and the peripheral wall of one of the two illuminating devices. The light rays emitted by the illuminating devices transmit through the lamp seats to indicate the position of the handrail.

8 Claims, 9 Drawing Sheets

ILLUMINANT HANDRAIL

BACKGROUND OF THE INVENTION

The present invention relates to an illuminant handrail and, more particularly, to an illuminant handrail suitable for a specific location on a ship, a vehicle, or a building.

A handrail can be mounted in a specific location of a ship, a vehicle, or a building to enable a user to hold the handrail while standing or walking, increasing movement safety. Furthermore, the user can stand up or sit easily by holding the handrail. However, people cannot find the handrail at night or when the indoor light is dim, leading to the risk of collision and falling.

Although illuminant handrails have been developed, the illuminant handrails generally include a transparent rod and two rod seats respectively fixed to two ends of the transparent rod, and an illuminating device is mounted in the rod to emit light rays through the transparent rod. However, the manufacturing costs and the assembling costs of the illuminant handrails are high. Furthermore, the transparent rod has insufficient structural strength and is, thus, liable to damage by impact.

Thus, a need exists for a novel illuminant handrail that mitigates and/or obviates the above disadvantages.

BRIEF SUMMARY OF THE INVENTION

The primary objective of the present invention is to provide two illuminating devices directly assembled to two fasteners at two ends of a rod, such that the light rays emitted by the illuminating devices can transmit through lamp seats to indicate the position of the handrail in a dim environment, permitting a user to hold and use the handrail. Thus, a safe illuminant indicating function is provided without stimulating the eyes of the user resulting from high brightness and without adversely affecting the structural strength of the rod.

An illuminant handrail according to the present invention includes a rod having two ends. Two fixing seats are respectively fixed to the two ends of the rod. A fastener is mounted to a bottom of and extends downward from each of the two fixing seats. Two illuminating devices are respectively mounted to the bottoms of the two fixing seats. Each of the two illuminating devices includes a lamp seat and an illuminating unit mounted in the lamp seat. The lamp seat of each of the two illuminating devices is transparent and includes a top wall and a peripheral wall connected to the top wall. The top wall includes a fixing hole through which one of the fasteners extends. Each illuminating unit includes a lighting unit and a circuit board. Each illuminating unit is mounted between the fixing hole and the peripheral wall of one of the two illuminating devices. The light rays emitted by the two illuminating devices transmit through the lamp seats to indicate the position of the handrail.

In an example, each lamp seat is hollow and includes a tubular wall extending from the top wall and delimiting the fixing hole. Each lamp seat further includes an annular wall surrounding and spaced from the tubular wall, defining an annular chamber between the tubular wall and the annular wall. The lighting unit and the circuit board of each of the two illuminating devices are mounted in the annular chamber between the annular wall and the tubular wall. A sealing layer is mounted to a bottom end of the annular chamber between the tubular wall and the annular wall.

In an example, each fastener includes an outer thread. A locking member is mounted in the fixing hole of each lamp seat and has a screw hole in threading connection with the outer thread of one of the fasteners. Each locking member includes a top end abutting the bottom of one of the two fixing seats. Each locking member further includes a stop portion at a bottom end thereof.

In an example, the top wall of each lamp seat abuts the bottom of one of the two fixing seats, and the tubular wall of each lamp seat abuts the stop portion of one of the locking members.

The illuminant handrail can further include a fixing board mounted to bottoms of the lamp seats and two gaskets. The fasteners extend through the fixing board. Each gasket is mounted between the bottom of one of the lamp seats and the fixing board.

The fixing board can include two through-holes and two wire holes. Each fastener extends through one of the through-holes. The stop portion of each locking member abuts the fixing board. An electric wire is connected to the circuit board of each illuminating unit and extends through one of the lamp seats and one of the two wire holes.

In an example, each of the two fixing seats can include a positioning hole. Each fastener is positioned in the positioning hole of one of the two fixing seats. Two nuts are mounted to a bottom side of the fixing board and are in threading connection with the outer threads of the fasteners.

In another example, each of the two fixing seats includes a positioning hole. Each fastener extends upward through one of the two through-holes of the fixing board and the screw hole of one of the locking members. The outer thread of each fastener is fixed in the positioning hole of one of the two fixing seats. Each fastener includes a head abutting the bottom side of the fixing board.

The present invention will become clearer in light of the following detailed description of illustrative embodiments of this invention described in connection with the drawings.

DETAILED DESCRIPTION OF THE INVENTION

FIGS. 1-6 show an illuminant handrail of a first example according to the present invention. The illuminant handrail can be mounted to a specific location on a ship, a vehicle, or a building. The illuminant handrail includes a rod 1, two illuminating devices 2, and two locking members 3, which can be assembled and fixed on a fixing board 4.

Figure 1:
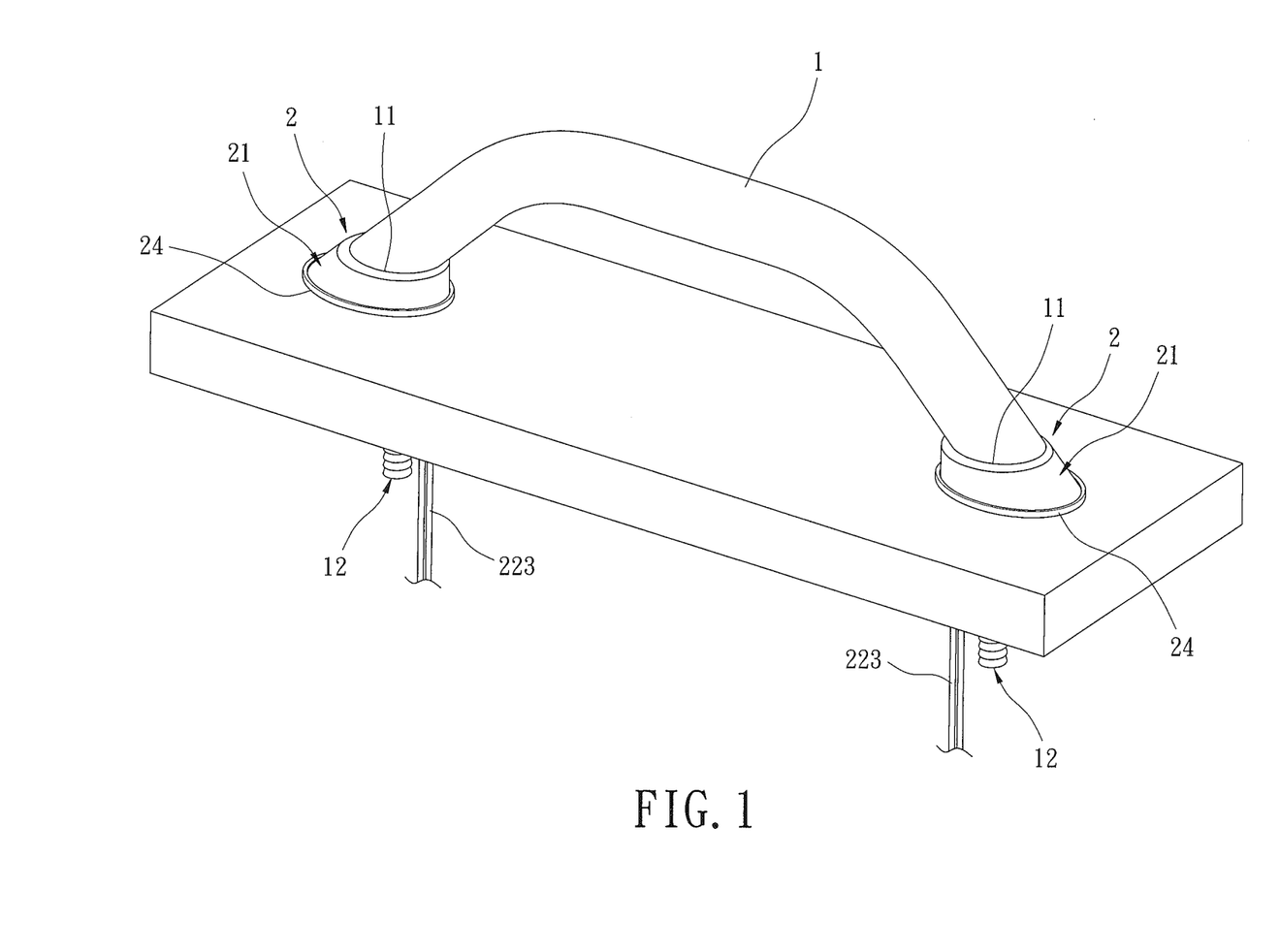
FIG. 1 is a perspective view of an illuminant handrail of a first example according to the present invention.
Figure 2:
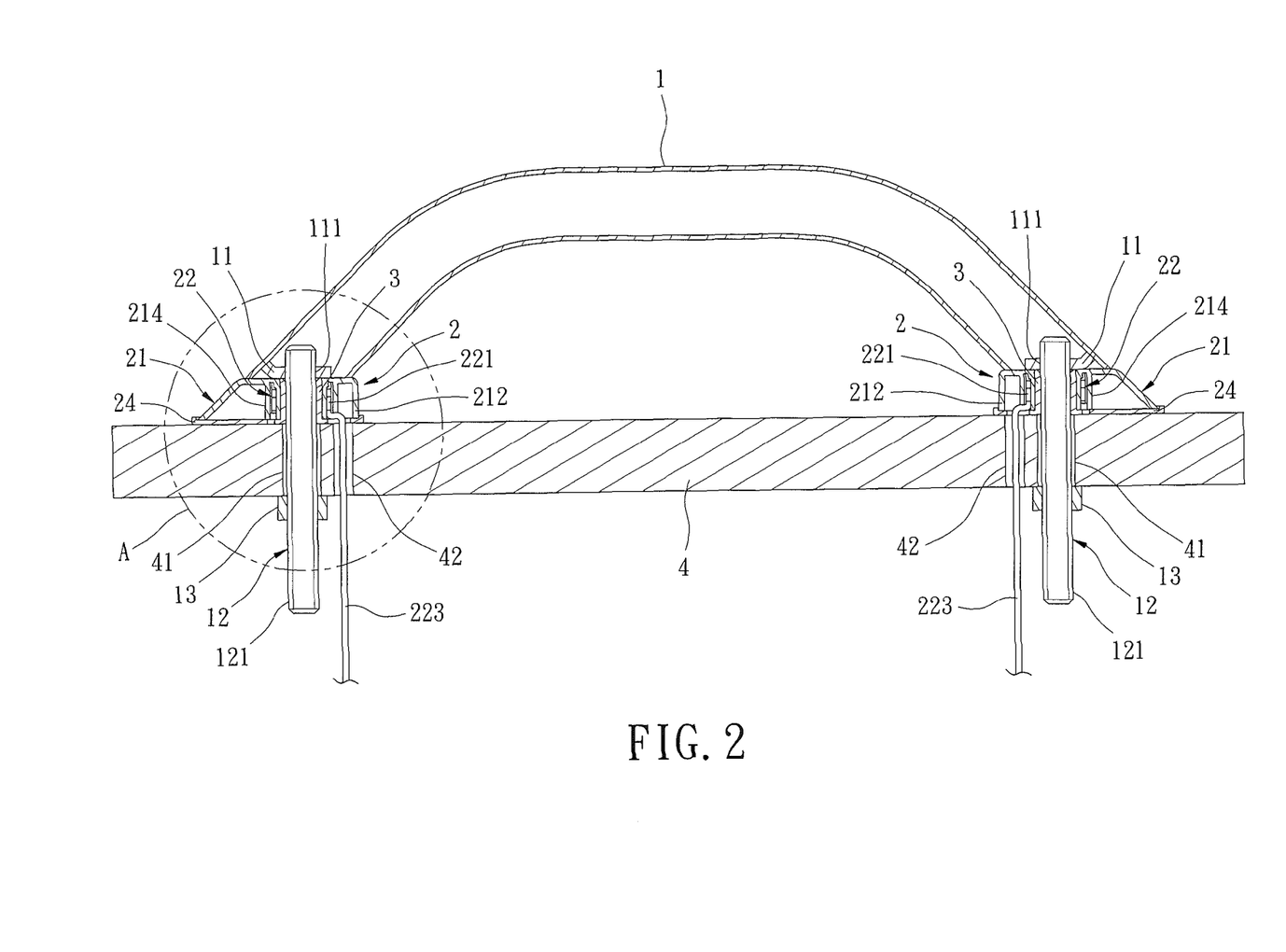
FIG. 2 is a cross sectional view of the illuminant handrail of FIG. 1.
Figure 3:
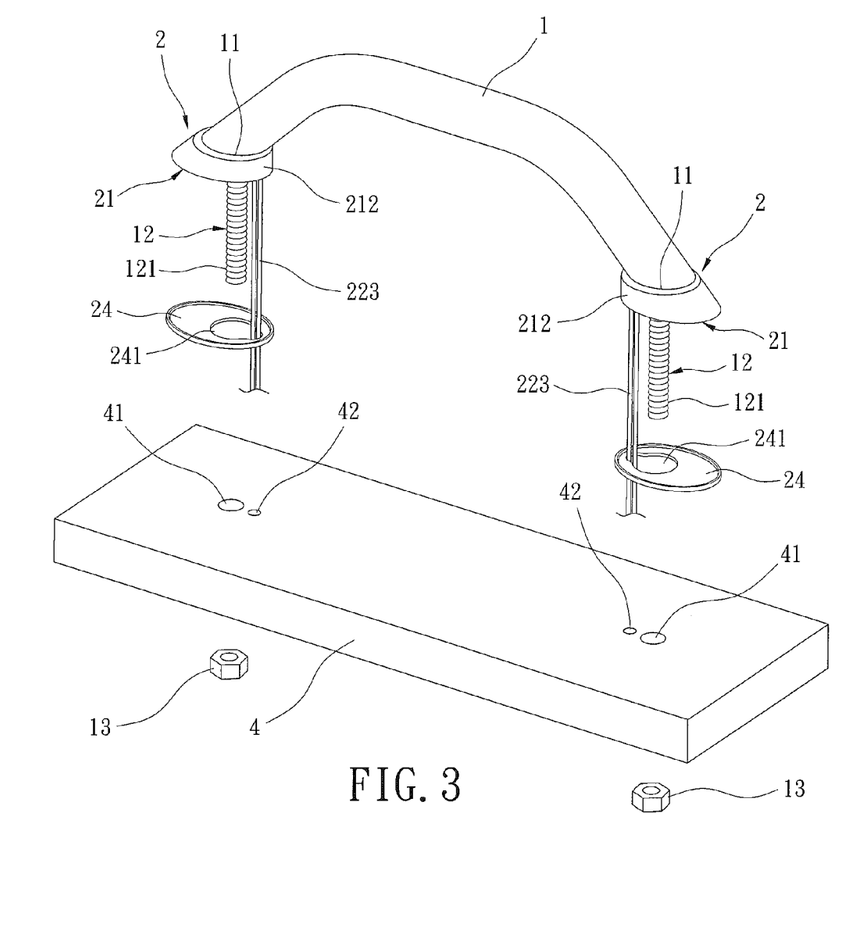
FIG. 3 is an exploded, perspective view of components of the illuminant handrail of FIG. 1.

Two fixing seats 11 are respectively fixed to two ends of the rod 1. Each fixing seat 11 has a positioning hole 111 for connection with a fastener 12 by threading connection or welding. Each fastener 12 is mounted to a bottom of one of the two fixing seats 11, extends downward from one of the two fixing seats 11, and has an outer thread 121.

Figure 4:
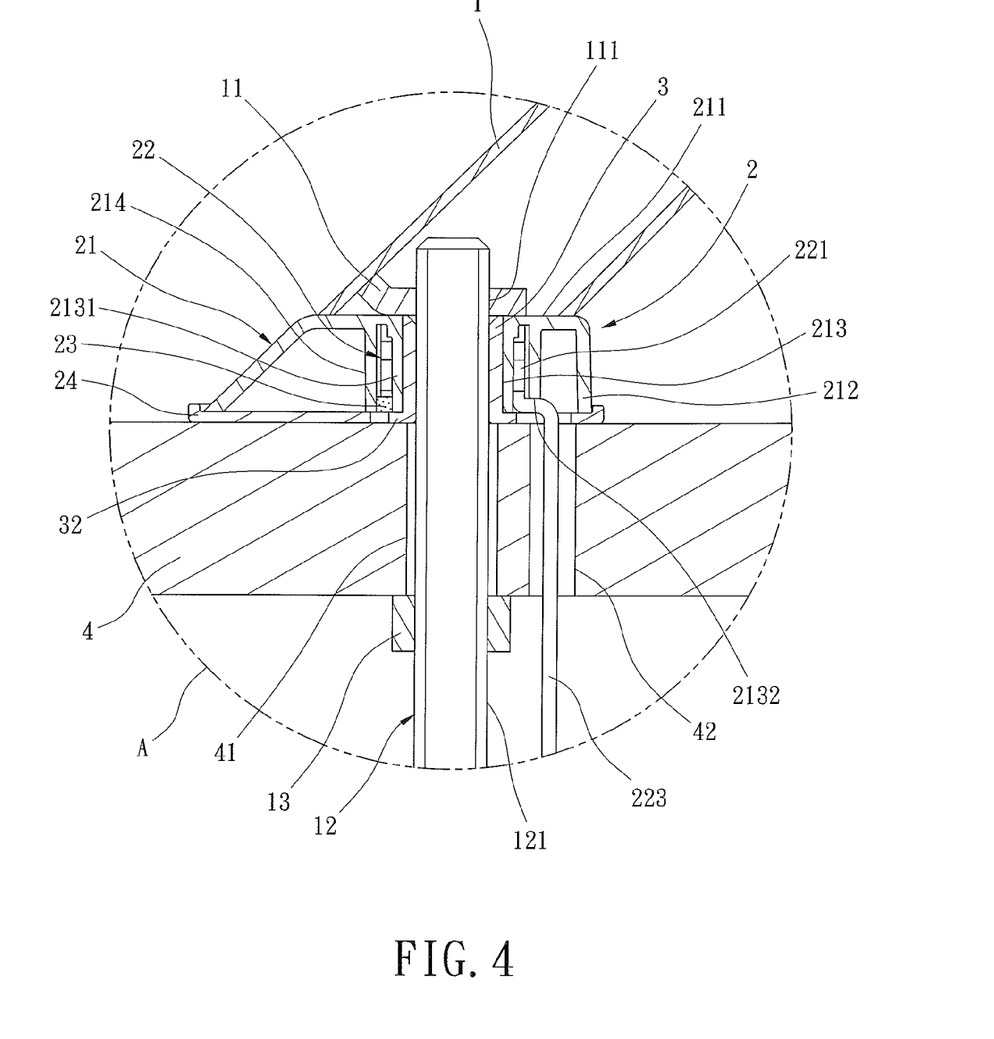
FIG. 4 is an enlarged view of a circled portion A of FIG. 2.
Figure 5:
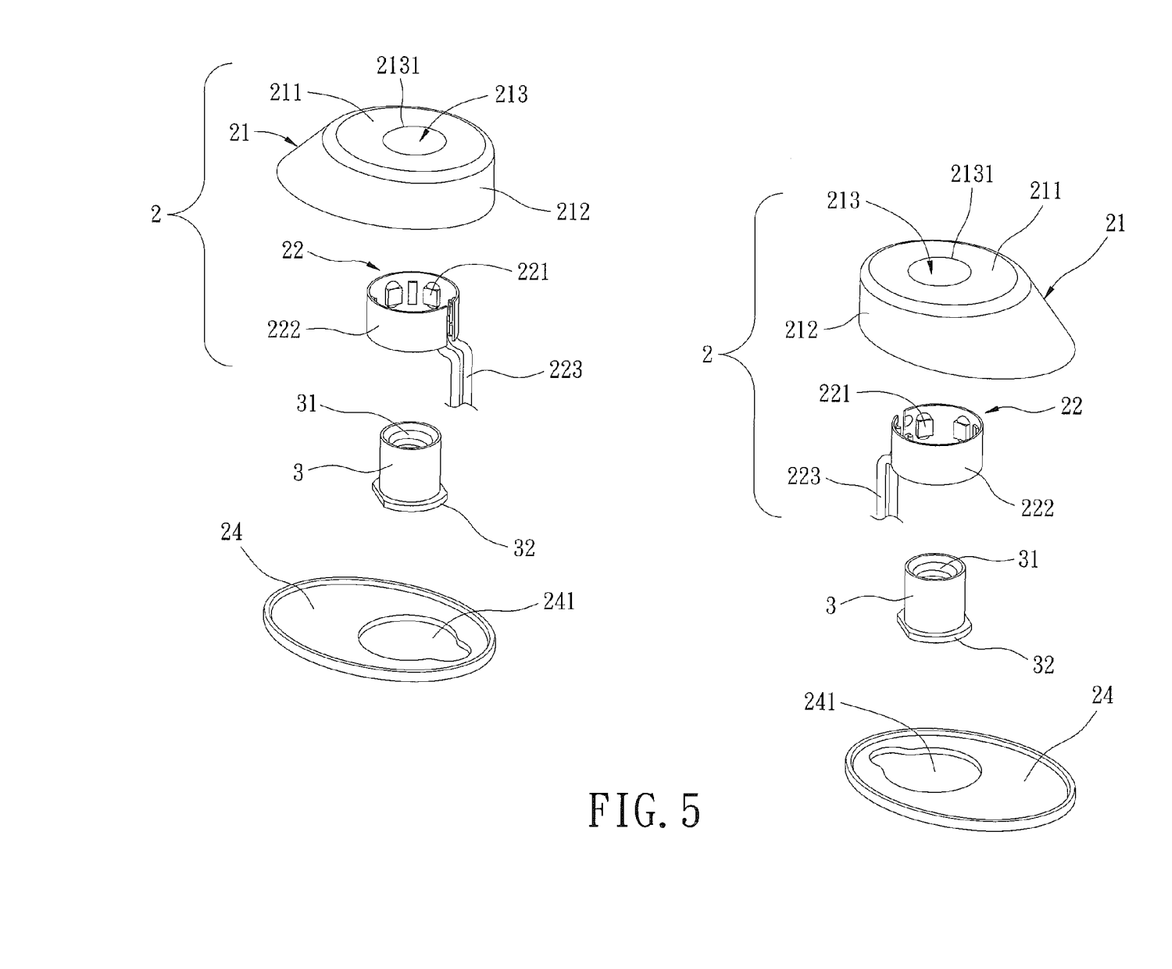
FIG. 5 is an exploded, perspective view of two illuminating devices of FIG. 3.
Figure 6:
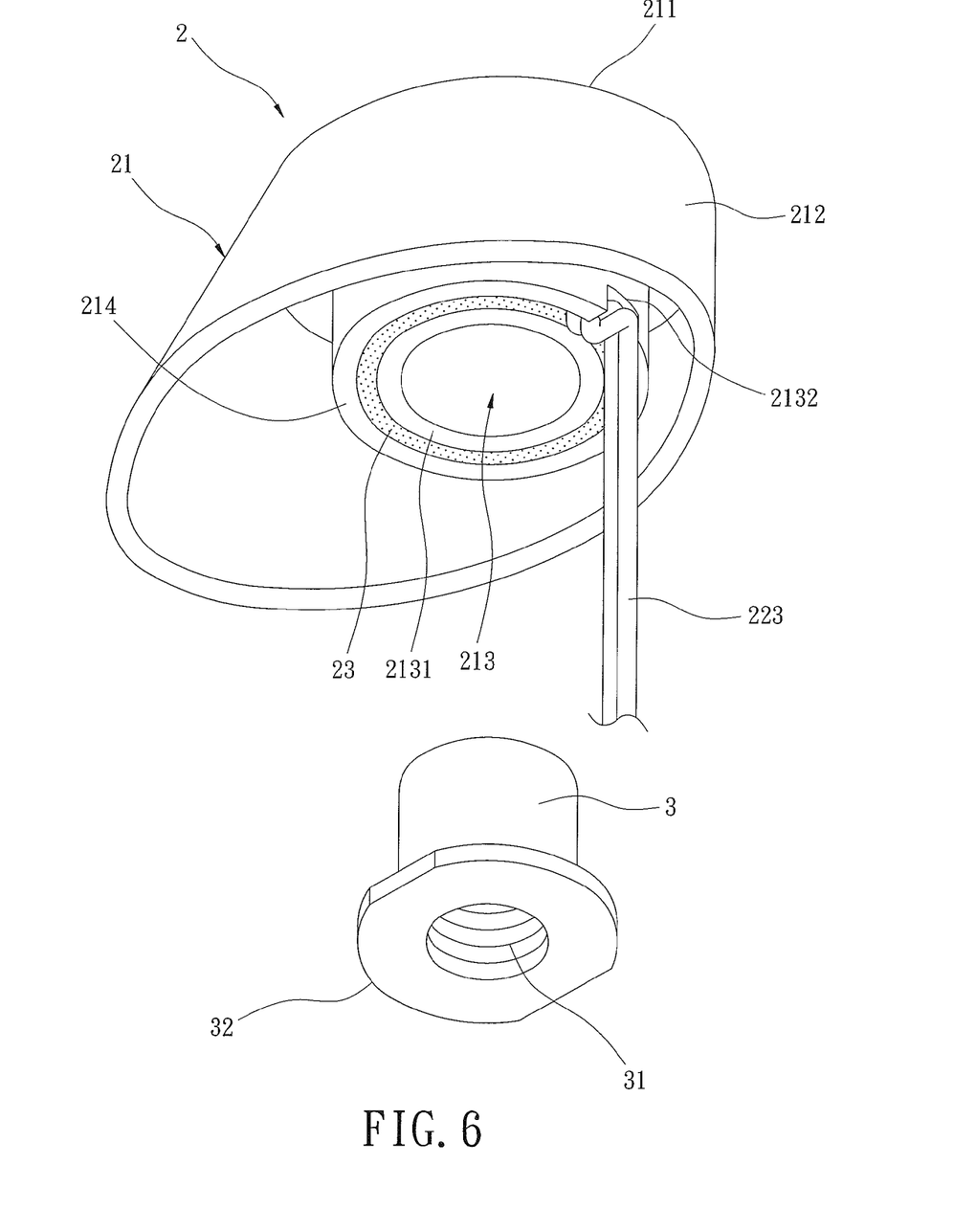
FIG. 6 is another exploded, perspective view of one of the illuminating devices and one of two fasteners in FIG. 5.

The two illuminating devices 2 are respectively mounted to the bottoms of the two fixing seats 11. Each illuminating device 2 includes a lamp seat 21 and an illuminating unit 22 mounted in the lamp seat 21. The lamp seat 21 of each illuminating device 2 is transparent and includes a top wall 211 and a peripheral wall 212 connected to the top wall 211. The top wall 211 includes a fixing hole 213 through which one of the fasteners 12 extends. Each illuminating unit 22 includes a lighting unit 221 and a circuit board 222. Each illuminating unit 22 is mounted between the fixing hole 213 and the peripheral wall 212 of one of the two illuminating devices 2. In this example, each lamp seat 21 is hollow and includes a tubular wall 2131 extending from the top wall 211 and delimiting the fixing hole 213. Each lamp seat 21 further includes an annular wall 214 surrounding and spaced from the tubular wall 2131, defining an annular chamber between the tubular wall 2131 and the annular wall 214. The lighting unit 221 can include light-emitting diodes (LED) or any other lighting element. With reference to FIGS. 4-6, in each illuminating device 2, the lighting unit 221 and the circuit board 222 are mounted in the annular chamber between the annular wall 214 and the tubular wall 2131. A sealing layer 23 mounted to a bottom end of the annular chamber between the tubular wall 2131 and the annular wall 214. An electric wire 223 is connected to the circuit board 222 and extends outward through an opening 2132 at the bottom of the tubular wall 2131.

Each locking member 3 is mounted in the fixing hole 213 of one of the lamp seats 21 and has a screw hole 31 in threading connection with the outer thread 121 of one of the fasteners 12. Each locking member 3 includes a top end abutting the bottom of one of the two fixing seats 11. Furthermore, each locking member 3 includes a stop portion 32 at a bottom end thereof.

The fixing board 4 can be fixed on a specific location on a ship, a vehicle, or a building. The fixing board 4 includes two through-holes 41 and two wire holes 42.

In assembly, each fastener 12 extends downward through the fixing hole 213 of the lamp seat 21 of one of the two illuminating devices 2 and is coupled with one of the locking members 3. The top wall 211 of each lamp seat 21 abuts the bottom of one of the two fixing seats 11. A bottom of the tubular wall 2131 of each lamp seat 21 abuts the stop portion 32 of one of the locking members 3. Next, the fasteners 12 on the two ends of the rod 1 extend through the through-holes 41 of the fixing board 4. The stop portions 32 of the locking members 3 abut a top side of the fixing board 4. The electric wires 223 of the two illuminating devices 22 extend downward through the lamp seats 21 and the wire holes 42 of the fixing board 4 for connection with an external power source (not shown). A gasket 24 is mounted between the bottom of each lamp seat 21 and the fixing board 4 and has an opening 241 through which the electric wire 223 extends. Two nuts 13 are mounted to a bottom side of the fixing board 4 and are in threading connection with the outer threads 121 of the fasteners 12. Thus, the rod 1, the fasteners 12, the nuts 13, the locking members 3, and the fixing board 4 are securely fixed. By such an arrangement, the two illuminating devices 2 are directly assembled to the fasteners 12 at the two ends of the rod 1, such that the light rays emitted by the illuminating units 22 can transmit through the lamp seats 21 to indicate the position of the handrail in a dim environment, permitting a user to hold and use the handrail. Thus, a safe illuminant indicating function is provided without stimulating the eyes of the user resulting from high brightness and without adversely affecting the structural strength of the rod 1.

Figure 7:
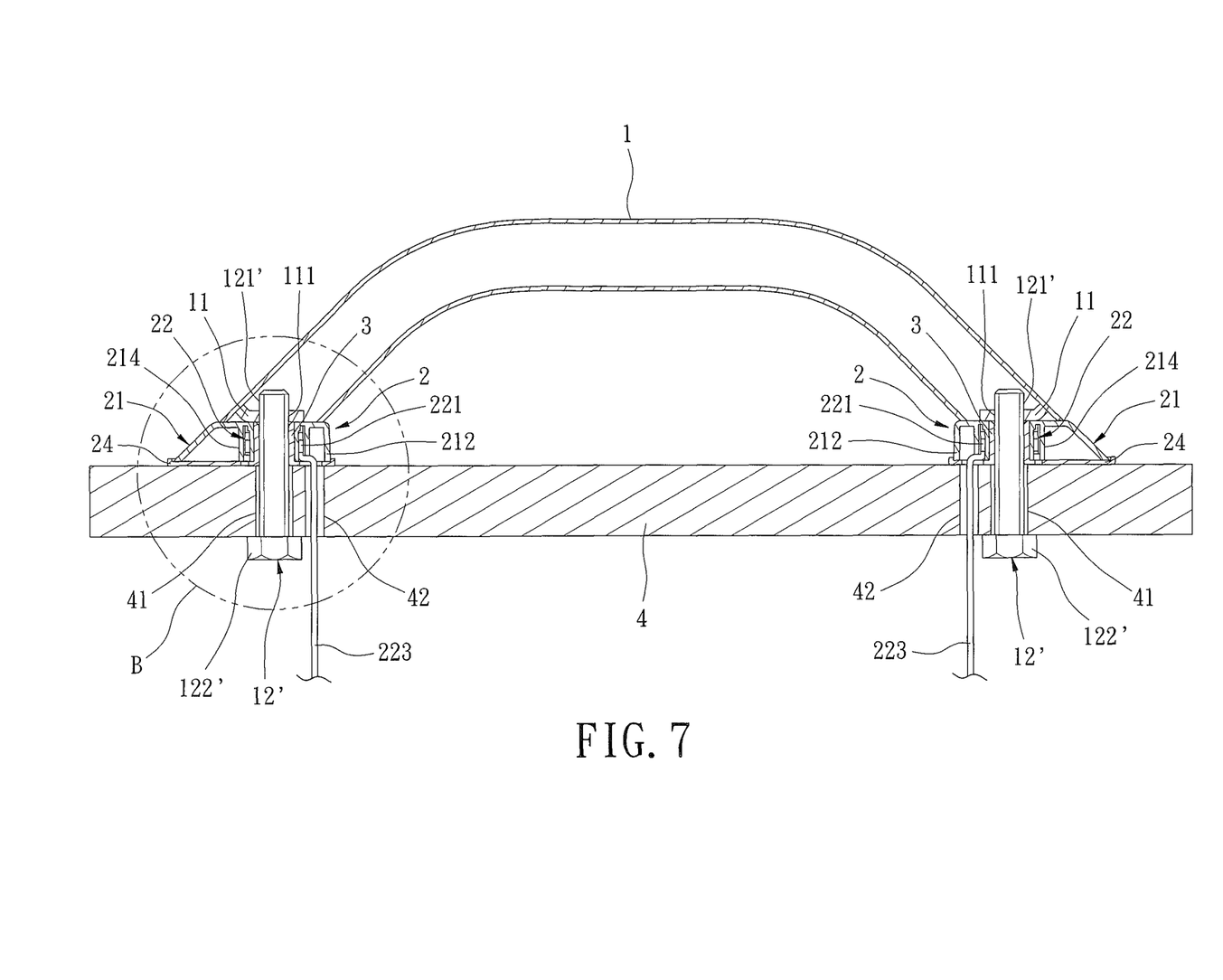
FIG. 7 is a cross sectional view of an illuminant handrail of a second example according to the present invention.
Figure 8:
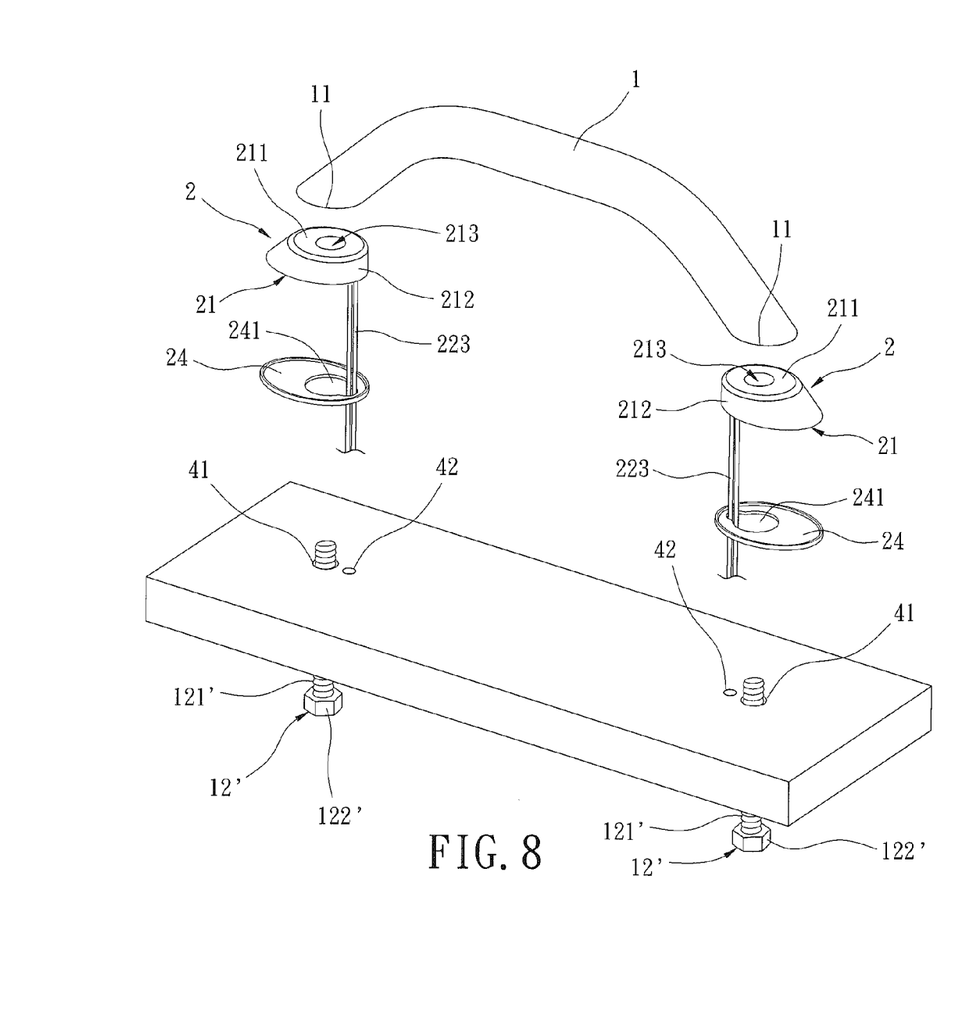
FIG. 8 is an exploded, perspective view of components of the illuminant handrail of FIG. 7.
Figure 9:
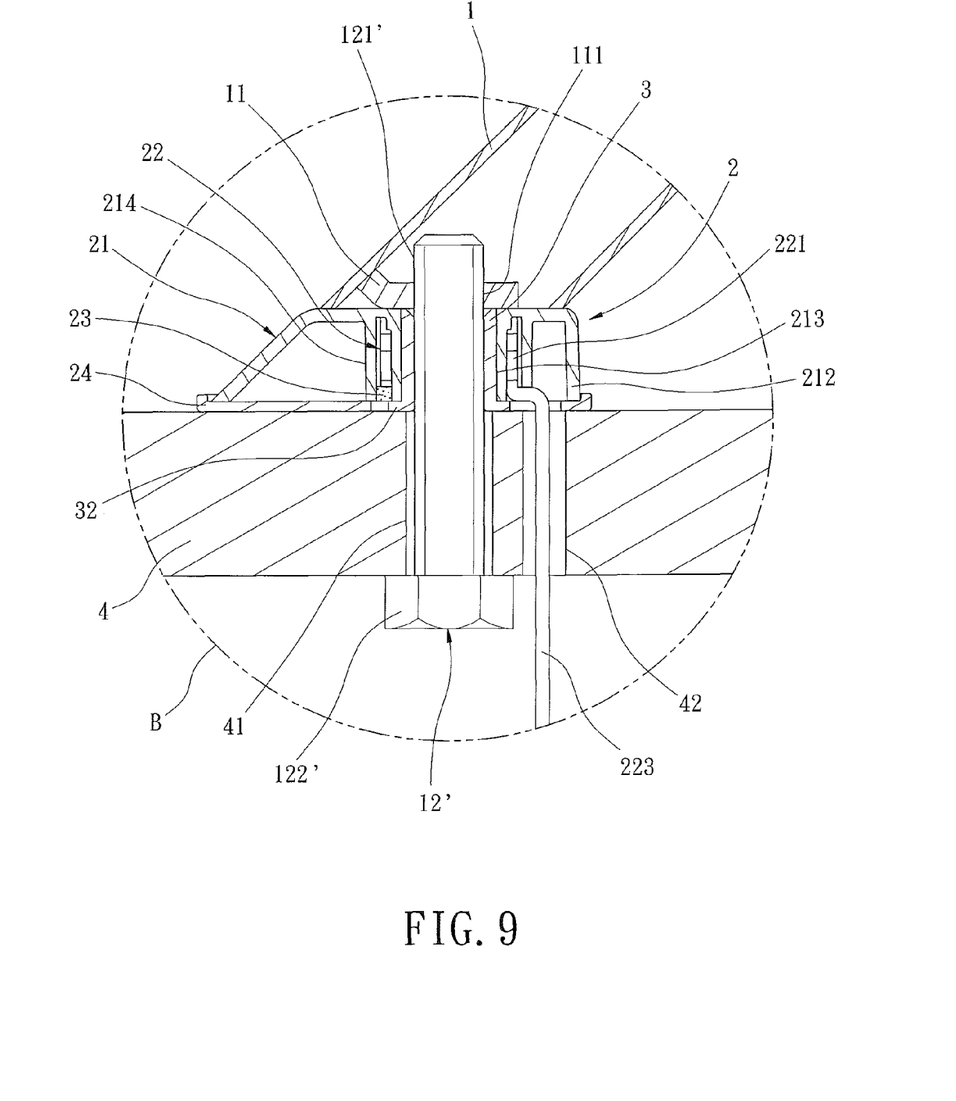
FIG. 9 is an enlarged view of a circled portion B of FIG. 7.

FIGS. 7-9 show a second example of the illuminant handrail. The differences between the second example and the first example are that each fastener 12' is in the form of a bolt having a hexagonal head 122'. Each fastener 12' extends upward through one of the two through-holes 41 of the fixing board 4 and the screw hole 31 of one of the locking members 3. The outer thread 121' of each fastener 12' is, securely engaged with an inner thread in the positioning hole 111 of one of the two fixing seats 11. The hexagonal head 122' of each fastener 12' abuts the bottom side of the fixing board 4, providing a secure positioning effect.

Although specific embodiments have been illustrated and described, numerous modifications and variations are still possible without departing from the scope of the invention. The scope of the invention is limited by the accompanying claims.

The invention claimed is:
1. An illuminant handrail comprising:
a rod including two ends, with two fixing seats respectively fixed to the two ends of the rod, and with a fastener mounted to a bottom of and extending downward from each of the two fixing seats; and
two illuminating devices respectively mounted to the bottoms of the two fixing seats, with each of the two illuminating devices including a lamp seat and an illuminating unit mounted in the lamp seat and emitting light rays, with the lamp seat of each of the two illuminating devices allowing the light rays emitted to pass therethrough and including a top wall and a peripheral wall connected to the top wall, with the top wall including a fixing hole through which one of the fasteners extends, with each illuminating unit including a lighting unit and a circuit board, with each illuminating unit mounted between the fixing hole and the peripheral wall of one of the two illuminating devices, with the lamp seats transmitting the light rays emitted by the two illuminating devices to indicate the position of the illuminant handrail,
with each lamp seat being hollow, with each lamp seat further including a tubular wall extending from the top wall and delimiting the fixing hole, with each lamp seat further including an annular wall surrounding and spaced from the tubular wall, defining an annular chamber between the tubular wall and the annular wall, with the lighting unit and the circuit board of each of the two illuminating devices mounted in the annular chamber between the annular wall and the tubular wall, and with a sealing layer mounted to a bottom end of the annular chamber between the tubular wall and the annular wall.

2. The illuminant handrail as claimed in claim 1, with each fastener including an outer thread, with a locking member mounted in the fixing hole of each lamp seat and having a screw hole in threading connection with the outer thread of one of the fasteners, with each locking member including a top end abutting the bottom of one of the two fixing seats, and with each locking member further including a stop portion at a bottom end thereof.

3. The illuminant handrail as claimed in claim 2, with the top wall of each lamp seat abutting the bottom of one of the two fixing seats, and with the tubular wall of each lamp seat abutting the stop portion of one of the locking members.

4. The illuminant handrail as claimed in claim 2, further comprising a fixing board mounted to bottoms of the lamp seats and two gaskets, with the fasteners extending through the fixing board, and with each gasket mounted between the bottom of one of the lamp seats and the fixing board.

5. The illuminant handrail as claimed in claim 4, with the fixing board including two through-holes and two wire holes, with each fastener extending through one of the through-holes, with the stop portion of each locking member abutting the fixing board, and with an electric wire connected to the circuit board of each illuminating unit and extending through one of the lamp seats and one of the two wire holes.

6. The illuminant handrail as claimed in claim 5, with each of the two fixing seats including a positioning hole, with each fastener positioned in the positioning hole of one of the two fixing seats, and with two nuts mounted to a bottom side of the fixing board and in threading connection with the outer threads of the fasteners.

7. The illuminant handrail as claimed in claim 5, with each of the two fixing seats including a positioning hole, with each fastener extending upward through one of the two through-holes of the fixing board and the screw hole of one of the locking members, with the outer thread of each fastener fixed in the positioning hole of one of the two fixing seats, and with each fastener including a head abutting the bottom side of the fixing board.

8. The illuminant handrail as claimed in claim 1, with each lamp seat being transparent.

\* \* \* \* \*